United States Patent
Sinusas

(10) Patent No.: US 10,906,660 B2
(45) Date of Patent: Feb. 2, 2021

(54) COWLING INLET FOR SIDEWARD AIRFLOW

(71) Applicant: Bell Textron Inc., Fort Worth, TX (US)

(72) Inventor: Eric Albert Sinusas, Southlake, TX (US)

(73) Assignee: Bell Textron Inc., Fort Worth, TX (US)

(*) Notice: Subject to any disclaimer, the term of this patent is extended or adjusted under 35 U.S.C. 154(b) by 253 days.

(21) Appl. No.: 16/059,321

(22) Filed: Aug. 9, 2018

(65) Prior Publication Data
US 2020/0047898 A1    Feb. 13, 2020

(51) Int. Cl.
| | | |
|---|---|---|
| *B64D 29/04* | (2006.01) | |
| *B64D 33/08* | (2006.01) | |
| *B64D 27/24* | (2006.01) | |
| *B64C 27/04* | (2006.01) | |

(52) U.S. Cl.
CPC ............. *B64D 29/04* (2013.01); *B64C 27/04* (2013.01); *B64D 27/24* (2013.01); *B64D 33/08* (2013.01)

(58) Field of Classification Search
CPC .. B64D 2027/026; B64D 27/24; B64D 29/04; B64D 33/08; B64D 33/10; B64C 27/04
USPC ...................................... 244/17.11, 53 B, 57
See application file for complete search history.

(56) References Cited

U.S. PATENT DOCUMENTS

| | | | | |
|---|---|---|---|---|
| 3,421,296 A | * | 1/1969 | Beurer, Sr. .............. | F02C 7/052 55/306 |
| 4,830,312 A | * | 5/1989 | Hain ....................... | B64D 33/08 244/17.11 |
| 8,931,732 B2 | | 1/2015 | Sirohi et al. | |
| 9,254,924 B2 | * | 2/2016 | Nager ..................... | B64D 41/00 |
| 9,446,842 B2 | | 9/2016 | Luyks | |
| 10,427,780 B2 | * | 10/2019 | Fenny .................... | B64C 27/025 |
| 2003/0080244 A1 | * | 5/2003 | Dionne .................. | B64D 33/08 244/57 |
| 2005/0178891 A1 | * | 8/2005 | Dennis ................... | B64D 33/08 244/57 |
| 2007/0068169 A1 | * | 3/2007 | Riley ..................... | B64D 41/00 60/778 |
| 2012/0312023 A1 | * | 12/2012 | Ertz ......................... | F02C 7/06 60/772 |
| 2013/0092789 A1 | | 4/2013 | Botti et al. | |
| 2015/0183521 A1 | * | 7/2015 | Ohnishi ................ | B64D 33/10 244/17.11 |
| 2016/0075439 A1 | * | 3/2016 | Mores ..................... | F02C 7/055 244/53 B |
| 2016/0107748 A1 | | 4/2016 | Luyks | |
| 2016/0177724 A1 | * | 6/2016 | Sheoran ................. | B64D 33/00 415/121.2 |
| 2016/0207625 A1 | * | 7/2016 | Judas ..................... | B64C 27/473 |
| 2016/0236767 A1 | * | 8/2016 | Mores ....................... | B64C 1/40 |
| 2017/0233091 A1 | * | 8/2017 | Iarocci .................. | B64D 33/08 244/129.5 |
| 2017/0297689 A1 | | 10/2017 | Lauder et al. | |

(Continued)

*Primary Examiner* — Richard R. Green
*Assistant Examiner* — Brady W Frazier
(74) *Attorney, Agent, or Firm* — Shackelford, Bowen, McKinley & Norton, LLP

(57) ABSTRACT

An exemplary vertical takeoff and landing includes a rotor driven by an electric motor, a generator located in a compartment and electrically connected to the electric motor, and an inlet formed through a side of the compartment to direct sideward airflow across the generator.

20 Claims, 6 Drawing Sheets

(56) References Cited

U.S. PATENT DOCUMENTS

| | | |
|---|---|---|
| 2017/0349273 A1 | 12/2017 | Parsons et al. |
| 2017/0349274 A1 | 12/2017 | Fenny et al. |
| 2017/0349276 A1 | 12/2017 | Fenny |
| 2018/0002009 A1 | 1/2018 | McCullough et al. |
| 2018/0002026 A1 | 1/2018 | Oldroyd et al. |
| 2018/0087650 A1 | 3/2018 | Poster |
| 2018/0105263 A1 | 4/2018 | Lauder |
| 2018/0111680 A1 | 4/2018 | Fenny et al. |
| 2019/0084684 A1 * | 3/2019 | Eller ................. B64C 11/30 |

* cited by examiner

COWLING INLET FOR SIDEWARD AIRFLOW

BACKGROUND

This section provides background information to facilitate a better understanding of the various aspects of the disclosure. It should be understood that the statements in this section of this document are to be read in this light, and not as admissions of prior art.

Rotorcraft heat-generating components, such as gearboxes and engines, are located within a compact engine compartment. The heat-generating components may require liquid cooling systems and some may be cooled by the natural airflow that circulates through the engine compartment during flight.

SUMMARY

An exemplary apparatus includes a compartment of an aircraft, a heat-generating component located in the compartment, and an inlet formed through a side of the compartment. An exemplary vertical takeoff and landing includes a rotor driven by an electric motor, a generator located in a compartment and electrically connected to the electric motor, and an inlet formed through a side of the compartment to direct sideward airflow across the generator.

An exemplary method includes directing a sideward airflow into a compartment of an in-flight vertical takeoff and landing aircraft to cool a heat-generating component inside of the compartment, wherein the sideward airflow is directed through an inlet in a side of the compartment.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
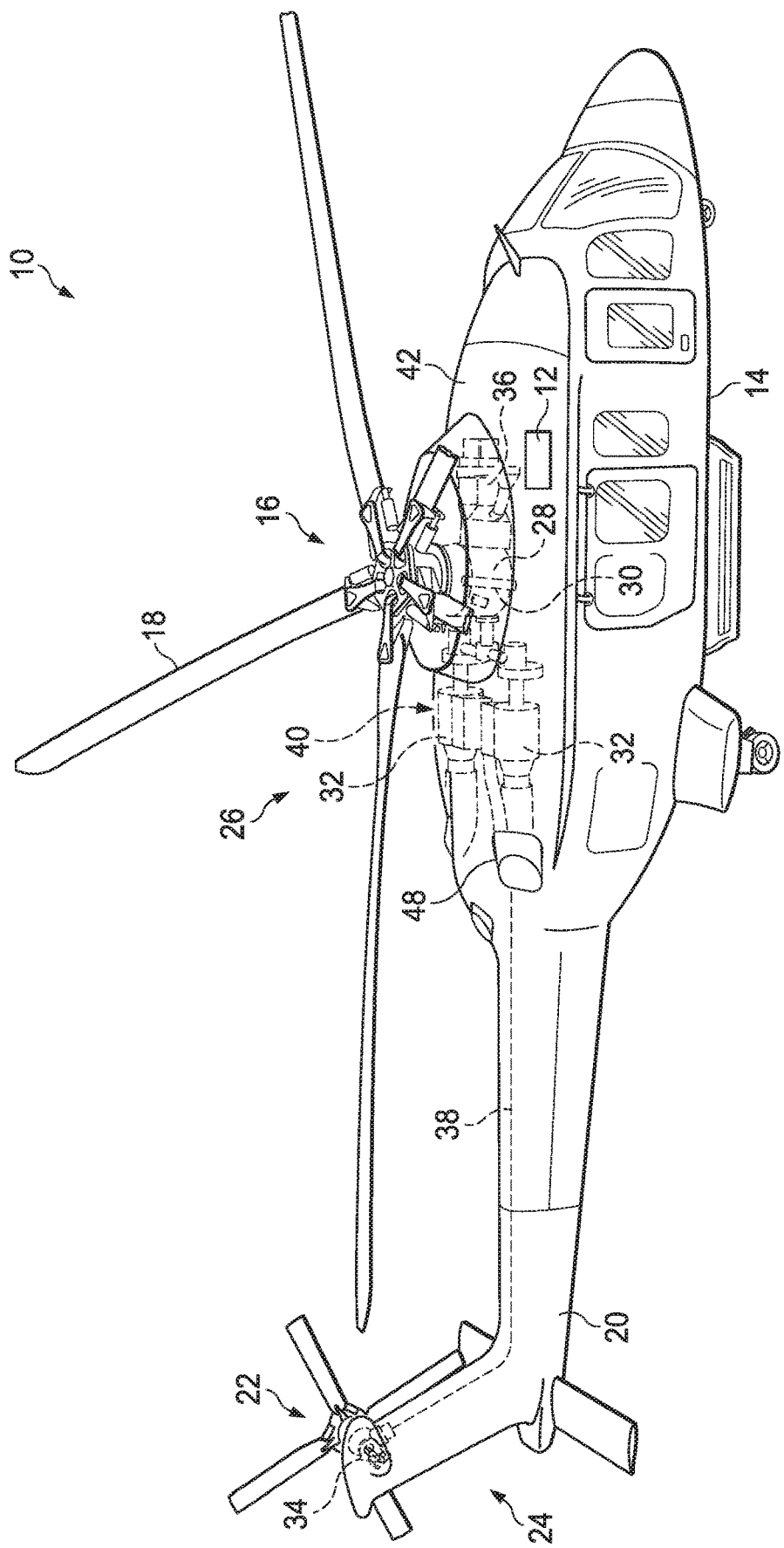
FIG. 1 illustrates an exemplary aircraft implementing a cowling inlet for sideward airflow according to one or more aspects of the disclosure.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "inboard," "outboard, "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements.

FIG. 1 illustrates an exemplary vertical takeoff and landing (VTOL) aircraft 10 incorporating a cowling inlet 12 for sideward airflow according to an embodiment of the disclosure. VTOL aircraft 10 has a fuselage 14 and a rotor system 16 carried thereon. Blades 18 are operably associated with rotor system 16 for creating flight. A tail boom 20 includes one or more tail rotors 22 that may be a component of an anti-torque system 24.

Tail rotor 22 may provide thrust in the same direction as the rotation of blades 18 to counter the torque effect created by blades 18. Blades 18 rotate clockwise in FIGS. 1 and 2. In some embodiments, the main rotor blades rotate counterclockwise. Teachings of certain embodiments recognize that tail rotors 22 may represent one example of an anti-torque rotor; other examples may include, but are not limited to, push propellers, ducted tail rotors, and ducted fans mounted inside and/or outside the tail boom. Anti-torque system 24 may include two or more tail rotors arranged for example in an electric distributed anti-torque system.

Aircraft 10 includes a propulsion system 26 to drive the rotor system 16 and tail rotor 22. The exemplary propulsion system 26 depicted in FIG. 1 includes a gearbox 28 connected to blades 18 via main rotor mast 30. One or more combustion engines 32 are connected to the gearbox 28. In this example, propulsion system 26 is a hybrid propulsion system including an electric motor 34 to drive tail rotor 22. One or more generators 36 are electrically connected to electric motor(s) 34 for example by conductors 38. Generator 36 is driven by engine 32 through gearbox 28 in FIG. 1. In this example, generator 36 is connected directly to gearbox 28, which is the main rotor gearbox. Generator 36 may be connected to the main rotor gearbox through an accessory gearbox. In some embodiments, generator 36 is connected directly to engine 32. Propulsion system 26 may be a hybrid system as illustrated in FIG. 1 or a traditional fuel-fired combustion system or an all-electric system.

Figure 2:
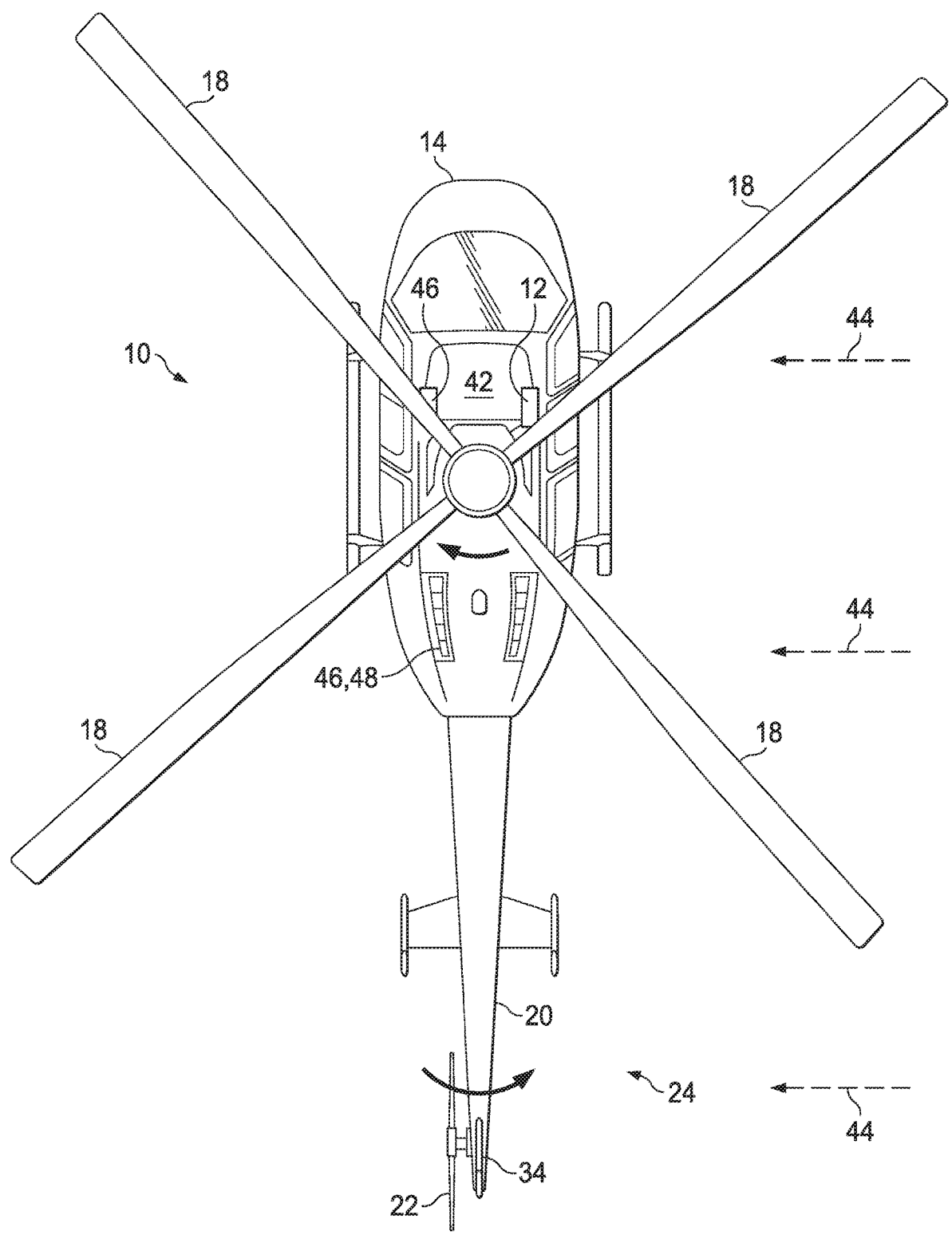
FIG. 2 illustrates another exemplary aircraft implementing a cowling inlet for sideward airflow according to one or more aspects of the disclosure.

Fuselage 14 includes a compartment 40 covered or enclosed by a cover or cowling 42. Heat-generating components such as generator 36 and combustion engine 32 are located inside of compartment 40. Cowling inlet 12 is an opening through a side of cowling 42 relative to the forward flight direction and directed into sideward airflow 44 (FIG. 2). Cowling 42 may include a top surface, front surface, rear surface, right side surface, and left side surface. The side surfaces extend in a generally vertical direction. Cowling inlet 12 may be a passive, always remaining open, or it may be selectively opened and closed. Cowling inlet 12 is illustrated on the right side of compartment 40; however, it may be on the left side.

In some embodiments, generator 36 is located proximate to mast 30 and forward of mast 30 to position the generator's weight proximate the center of gravity of aircraft 10 and to counter the weight of engines 32 and motors 34 located aft of mast 30. In the illustrated embodiments, cowling inlet 12 is located forward of mast 30 and axially aligned with generators 36. In some embodiments, cowling inlet 12 may be positioned axially forward or aft of generators 36.

FIG. 2 illustrates a top view of another exemplary VTOL aircraft 10 according to one or more aspects of this disclosure described with additional reference to the other figures. Cowling inlet 12 is located in cowling 42 on the side of fuselage 14 facing sideward airflow 44. Compartment 40 has a cowling outlet 46. In FIG. 2, cowling outlet 46 is located on a side of compartment 40 opposite from inlet 12. In an embodiment, cowling inlet 12 and cowling outlet 46 are axially aligned. Cowling outlet 46 may be located on a surface other than the side opposite from cowling inlet 12. Sideward airflow 44 enters the compartment through open cowling inlet 12 and circulates out through cowling outlet 46. A heat-generating component, or its cooling system, may be located in compartment 40 between cowling inlet 12 and cowling outlet 46 so that sideward airflow 44 is diverted to cool the heat-generating component. In some embodiments, cowling inlet 12 and cowling outlet 46 are not axially aligned but oriented such that sideward airflow 44 is diverted across the heat-generating components, or its cooling system. In some embodiments, cowling outlet 46 is not an opening through a side, but provided by an opening formed in another cowling surface, for example on the top surface at mast 30 or proximate engine exhaust 48.

The maximum thrust and power required by anti-torque systems occurs in sideward flight or in hover with sideward airflow, typically limited to 35-knot sideward flight or airflow conditions. Electric anti-torque systems are sized to meet the maximum thrust required in sideward flight conditions and are therefore overdesigned for other flight conditions. For example, when aircraft 10 is in a cruise mode the anti-torque system may not need to be operated. Generators produce an extraordinary amount of heat and must be sized to provide the electrical power required by the motor(s) driving the anti-torque system. Generators are commonly air-cooled or liquid-cooled to prevent overheating. Air-cooled systems are generally implemented for smaller generators and liquid-cooled systems are implemented for larger generators.

Cowling inlet 12 is configured to harvest sideward airflow 44 to cool components of propulsion system 26 located in compartment 40. In some embodiments, cowling inlet 12 is configured to harvest sideward airflow 44 to cool generator(s) 36 used in an electric anti-torque system 24. Implementing cowling inlet 12 may permit using a smaller size generator, using an air-cooled generator as opposed to a liquid-cooled generator, and/or using a smaller size liquid-cooling system than would be required without cowling inlet 12.

Figure 3:
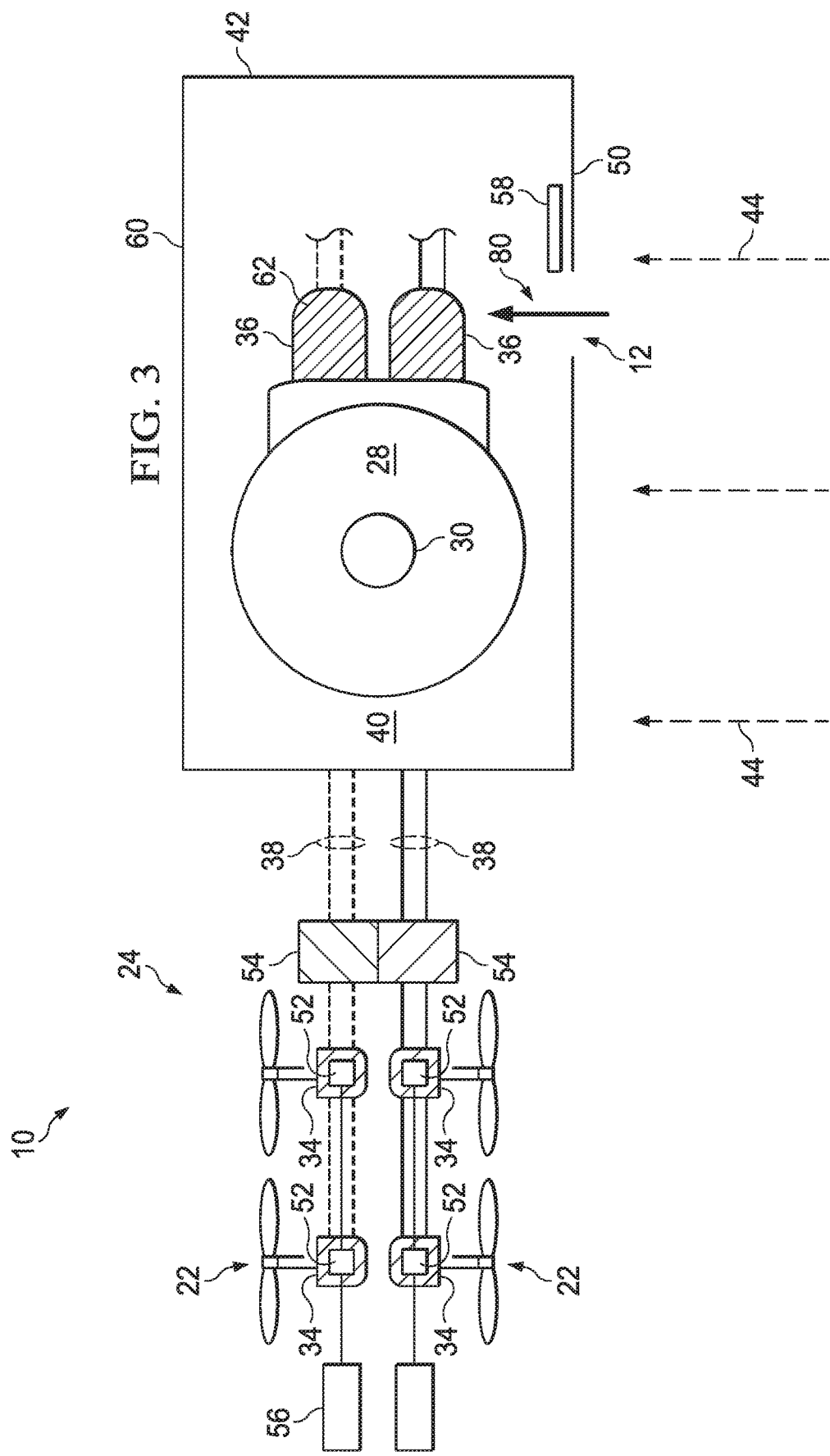
FIG. 3 illustrates a diagram of an exemplary aircraft implementing a cowling inlet for sideward airflow according to one or more aspects of the disclosure.
Figure 4:
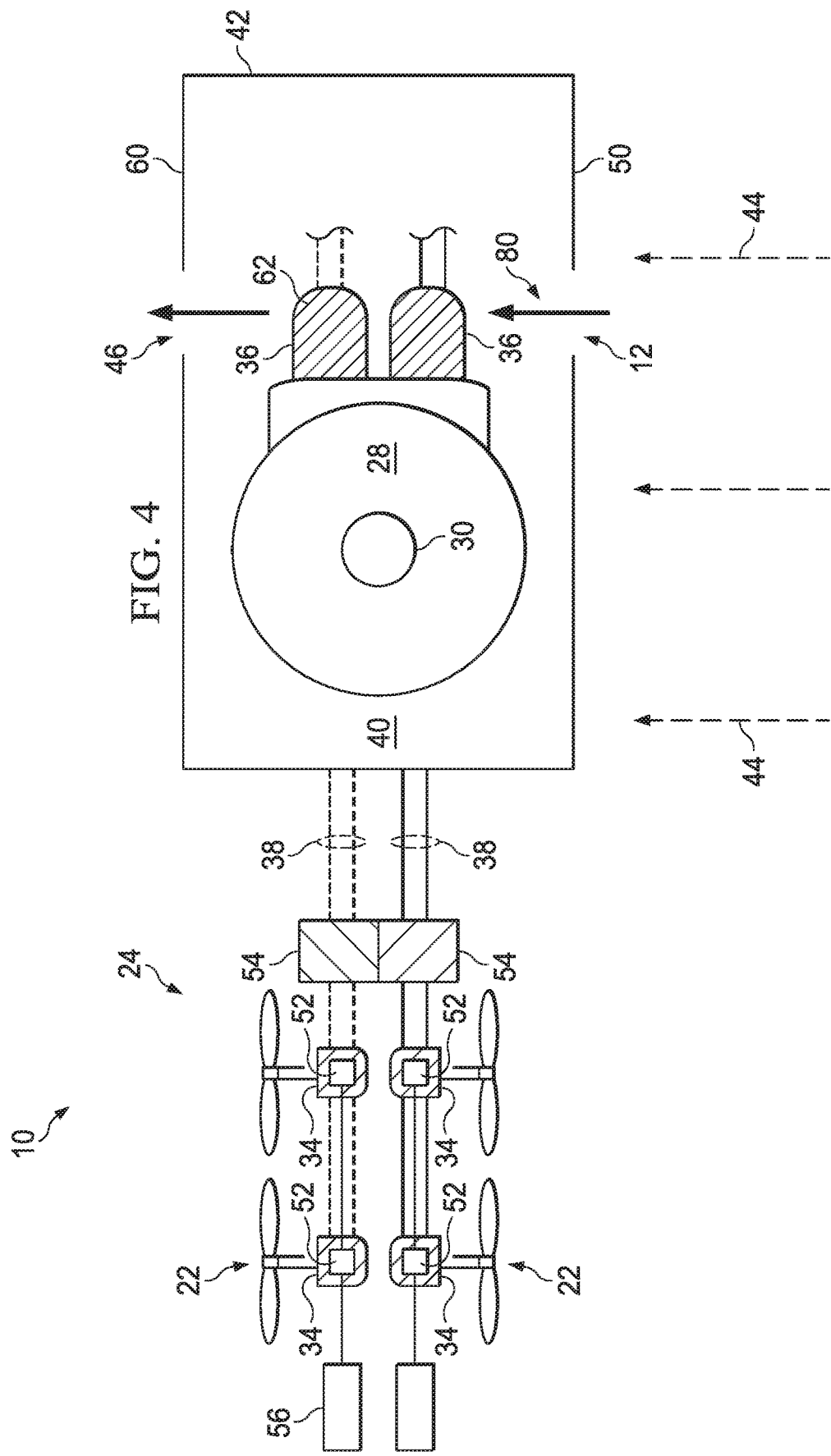
FIG. 4 illustrates a diagram of another exemplary aircraft implementing a cowling inlet for sideward airflow according to one or more aspects of the disclosure.
Figure 5:
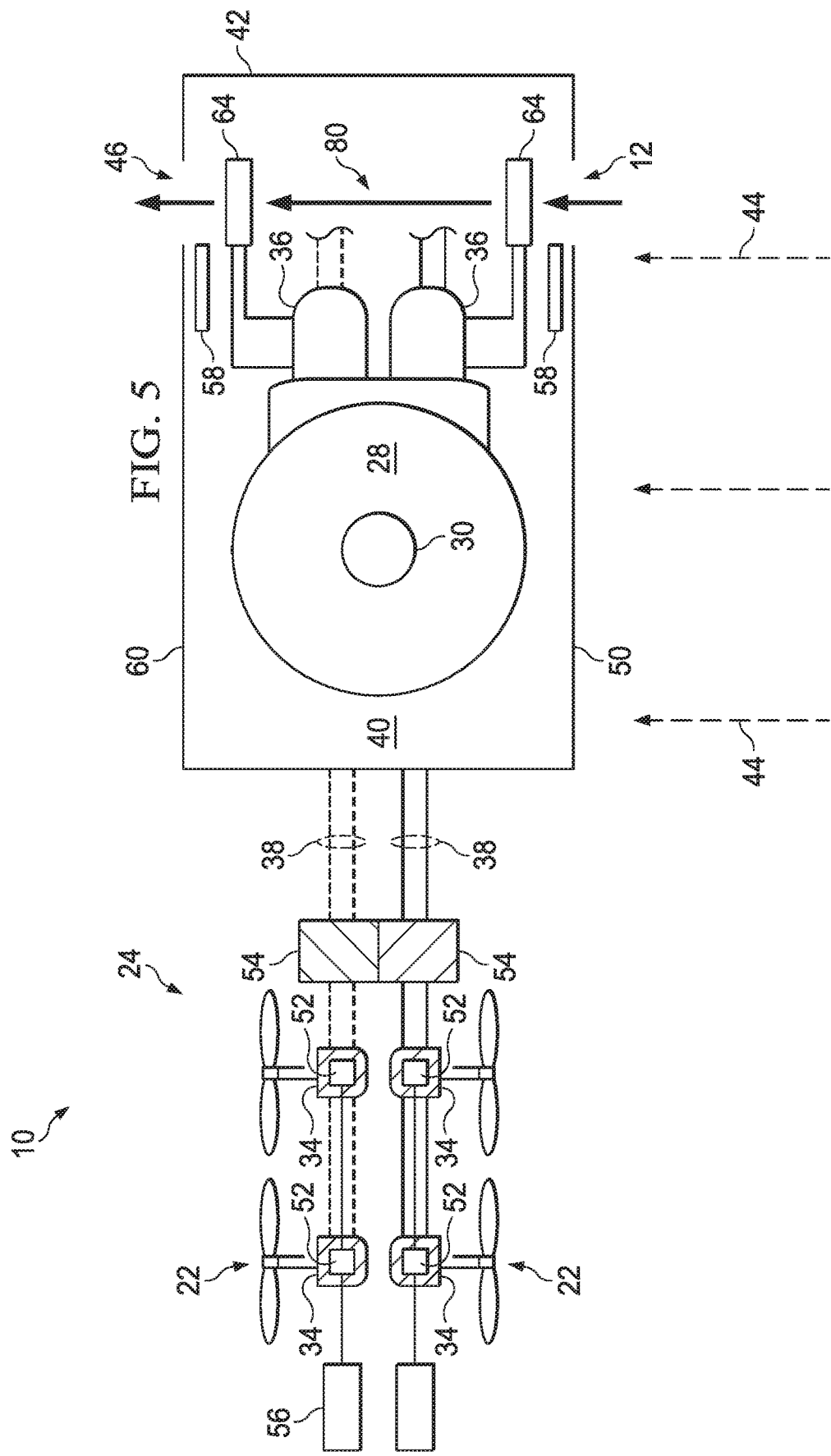
FIG. 5 illustrates a diagram of another exemplary aircraft implementing a cowling inlet for sideward airflow according to one or more aspects of the disclosure.

FIGS. 3-5 illustrate exemplary diagrams of VTOL aircrafts 10 implementing cowling inlets 12, which are described with additional reference to the other figures. Aircraft 10 includes generators 36 located in an compartment 40 covered by a cowling 42. Cowling inlet 12 is formed through side 50 of cowling 42 oriented toward sideward airflow 44. In the illustrated examples, aircraft 10 has an anti-torque system 24 using multiple tail rotors 22 arranged for example in an electric distributed anti-torque arrangement. Each tail rotor 22 includes an electric motor 34 and each electric motor 34 has an individual speed control 52. Anti-torque system 24 includes a gearbox 28 connected to generators 36. Generators 36 are electrically connected via conductors 38 to motors 34. Generators 36 and motors 34 are connected for example to power management unit 54 and control computers 56, which can be the flight control computer. A non-limiting example of an electric distributed anti-torque system is disclosed in U.S. Publication 2017/0349276, the teachings of which are incorporated herein by reference. Although FIGS. 3-5 illustrate multiple tail rotors 22, aircraft 10 may implement a single tail rotor 22.

Cowling inlet 12, illustrated in the FIG. 3 embodiment, is an active cowling inlet and includes a barrier 58 that can be moved between an open position and a closed position. Barrier 58 is shown in the open position in FIG. 3 moved away from cowling inlet 12 to permit sideward airflow 44 to enter compartment 40. Barrier 58 is illustrated as a planar member that may for example slide between the open position uncovering the opening and a closed position blocking the opening. Barrier 58 may take other forms, such as a hinged member that may pivot outward or inward from the cowling or a moveable louver. An example of an active cowling opening, cowling inlet 12 and/or cowling outlet 46, is illustrated and described with reference to FIG. 6.

FIG. 3 does not illustrate an outlet through side 60 of cowling 42, and sideward airflow 44 may circulate out of compartment 40 through one or more outlet openings in cowling 42, such as through the top or rear surface. In this example, side 50 is a right side relative to the direction of flight. Openings exist in the cowling for example around mast 30, engine exhausts 48, and vents. Cowling 42 may have a cowling outlet 46 located through side 60 as illustrated in FIG. 4. Generators 36, illustrated in FIG. 3, are air-cooled as depicted by fins 62. Generators 36, in particular fins 62, are positioned in a path 80 of sideward airflow 44 as it is diverted through cowling inlet 12 into compartment 40. Cowling inlet 12 is axially aligned with generator 36 in this example to divert or direct sideward airflow 44 across generator 36, in particular across the generator's cooling system, which are fins 62 in this example. In one or more embodiments, generator 36 is positioned in a path 80 between cowling inlet 12 and a cowling outlet 46 located on side 60 or another surface of cowling 42.

FIG. 4 illustrates an exemplary aircraft 10 implementing a passive cowling inlet 12 located on side 50 of cowling 42. Passive cowling inlet 12 remains open and does not have an associated barrier to close the opening. In this example, a cowling outlet 46 is located on side 60 of cowling 42 axially aligned with cowling inlet 12 to promote the flow of sideward airflow 44 across generators 36, which are positioned in path 80 between cowling inlet 12 and cowling outlet 46. Although cowling outlet 46 is shown axially across from cowling inlet 12 it may be offset axially.

FIG. 5 illustrates an exemplary aircraft 10 implementing an inlet 12 located on side 50 of cover 42 with a component cooling device 64. In this example, generators 36 are liquid-cooled via heat exchangers 64. In some embodiments, such as illustrated in FIG. 5, heat exchangers 64 are oriented generally perpendicular to path 80 of sideward airflow 44 through compartment 40 as directed through inlet 12. In this illustrated embodiment, inlet 12 and outlet 46 are axially aligned with generator 36 via its cooling device, heat exchanger 64. In some embodiments, outlet 46 may not be located on side 60 or not axially aligned with inlet 12. In this example embodiment, inlet 12 and outlet 46 are both active openings, each having a barrier 58 that can be moved to change the cross-section of inlet 12 and outlet 46. In some embodiments, inlet 12 and outlet 46 may be passive. An example of an active opening is described with reference to FIGS. 6 and 7.

Figure 6:
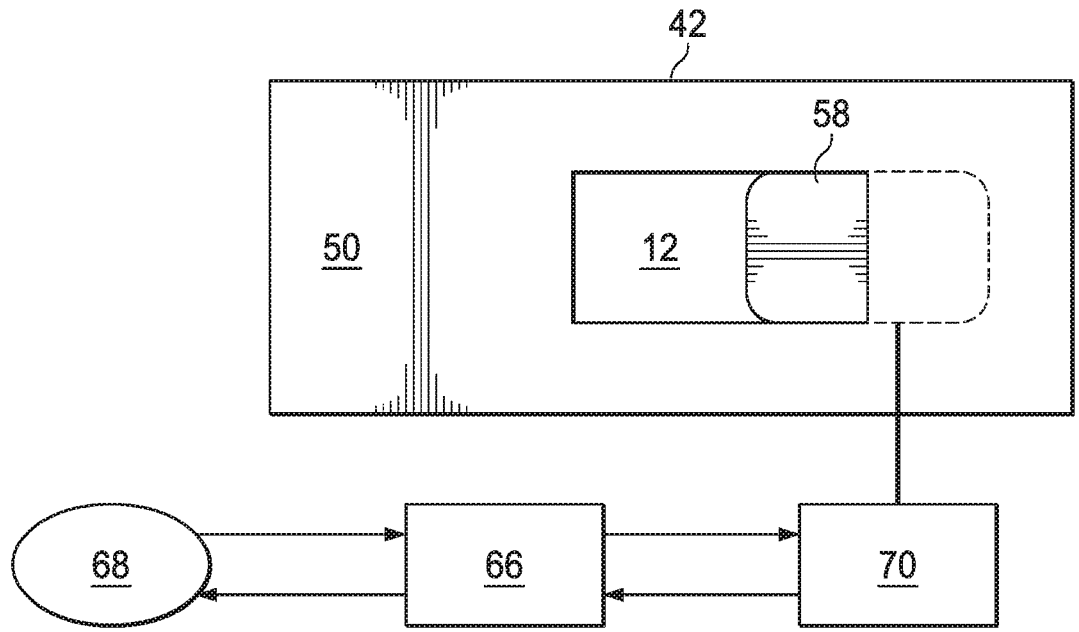
FIG. 6 illustrates a diagram of an active cowling inlet for sideward airflow according to one or more aspects of the disclosure.

FIG. 6 illustrates an exemplary active opening in a compartment cover, described with reference to inlet 12 and with additional reference to the other figures. Inlet 12 is formed through side 50 of a compartment 40. A control unit 66, which may be a flight control computer, is connected to a sensor 68 that can measure a condition such as the velocity of sideward airflow 44 or a compartment 40 condition such as temperature. The measured temperature may be a temperature of compartment 40 or a temperature of a heat-generating component such as generator 36. An actuator 70 is connected to barrier 58 to move it between an open position uncovering inlet 12 and a closed position blocking inlet 12. Control unit 66 is connected to actuator 70 to control the movement of barrier 58 and the cross-section opening of inlet 12. Inlet 12 may be opened and closed in response to pilot input through control unit 66 and or it may be opened and closed by control logic in control unit 66. As will be understood by those skilled in the art with the benefit of this disclosure, an outlet may be operated in conjunction with active inlet 12.

Figure 7:
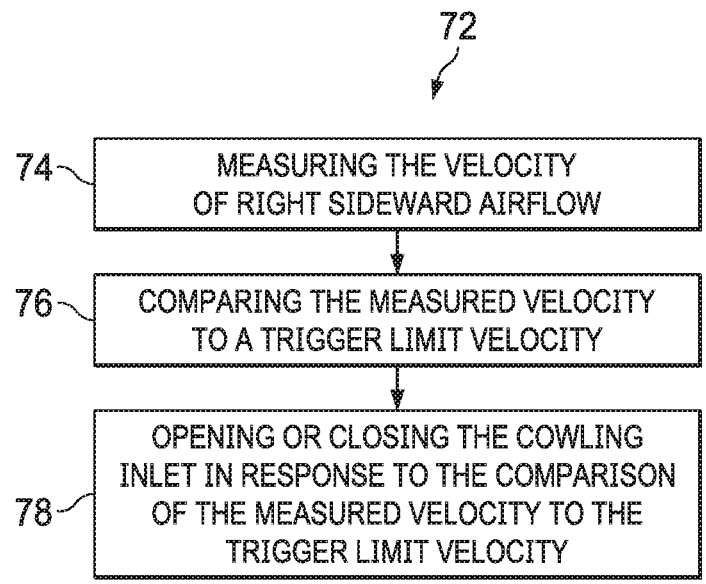
FIG. 7 illustrates a flowchart for an exemplary method of operating an active cowling opening for sideward airflow according to one or more aspects of the disclosure.

FIG. 7 shows a flowchart of an example control logic 72 for opening and closing an opening such as inlet 12 and/or outlet 46. It may be desired to close inlet 12, and outlet 46, in conditions in which an opening in the side of the covering 42, e.g., fuselage, may introduce unnecessary drag. For example, in a normal cruise mode enhanced component cooling is not needed, there is not sufficient sideward airflow to be harvested, and an opening in the side of the fuselage may create unnecessary drag.

At block 74, control logic 72, which can be in control unit 66, receives measurements of a condition from sensor 68. The condition measured may be without limitation the velocity of sideward airflow 44, a temperature of compartment 40, or a temperature of a heat-generating component such as a generator. At block 76, control logic 72 compares the measured condition to a trigger limit. At block 78, control logic 72 moves barrier 58 to open or close inlet 12 in response to the comparison of the measured condition to the trigger limit. In some embodiments, an outlet 46 is opened and closed in conjunction with inlet 12. In some embodiments, inlet 12 or outlet 46 is partially opened or closed at pilot discretion or based on control logic referencing measured conditions, such as sideward airflow velocity or generator temperature.

In an exemplary embodiment, the measured condition and the trigger limit are velocity of sideward airflow 44. At block 74, control logic 72 receives a measurement of the velocity of sideward airflow 44. At block 76, control logic 72 compares the measured velocity to the trigger limit velocity. At block 78, control logic 72 moves barrier 58 from a closed position to an open position if the measured velocity is greater than the trigger limit or moves barrier 58 from the open position to the closed position if the measured velocity is less than the trigger limit.

The trigger limit can be selected based on various criteria. In accordance to some embodiments, the measured condition is the velocity of sideward airflow 44 and the trigger limit is a set at a value of approximately 35-knots or less than 35-knots. In an embodiment, the sideward airflow trigger limit is approximately 30-knots. In one embodiment, the sideward airflow trigger limit is approximately 25-knots. In one embodiment, the sideward airflow trigger limit is approximately 20-knots. In one embodiment, the sideward airflow trigger limit is approximately 15-knots.

An exemplary method includes directing a sideward airflow 44 into a compartment 40 of an in-flight vertical takeoff and landing (VTOL) aircraft 10 to cool a heat-generating component inside of the compartment, wherein the sideward airflow is directed through an inlet 12 in a side 50 of a cover 42. An outlet 46 may be formed through an opposite side 60 of cover 42. In an embodiment, inlet 12 is opened in response to a velocity of sideward airflow 44 exceeding a trigger limit velocity. In another embodiment, inlet 12 is opened in response to a temperature inside of compartment 40. In another embodiment, inlet 12 is opened in response to a temperature of a component, e.g., generator 36, located inside of compartment 40. Opening and closing of inlet 12 and outlet 46 includes partial opening and closing to choke airflow through the orifice.

In an embodiment, an outlet 46 is formed through a side 60 of cover 42 and a generator 36 is positioned in a path 80 between inlet 12 and outlet 46. Opening inlet 12 and outlet 46, at block 78, in response to a measured conditions, such as and without limitation, a velocity of the sideward airflow 44, temperature of generator 36, temperature in compartment 40, being greater than a trigger limit and closing openings 12, 46 in response to the measured condition being less than the trigger limit.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. An apparatus, comprising:
   a compartment of a vertical takeoff and landing (VTOL) aircraft;
   a heat-generating component located in the compartment;
   an inlet formed through a side of the compartment relative to forward flight and directed into sideward airflow;
   an inlet barrier movable between an open position uncovering the inlet and a closed position blocking the inlet; and
   an outlet formed through the compartment and an outlet barrier movable between an open position uncovering the outlet and a closed position blocking the outlet; and
   each of the inlet barrier and the outlet barrier operable to be moved to the open position when a condition meets or exceeds a trigger limit and to be moved to the closed position when the condition is less than the trigger limit.

2. The apparatus of claim 1, wherein the condition is a velocity of sideward airflow or a temperature in the compartment or of the heat-generating component.

3. A vertical takeoff and landing (VTOL) aircraft, comprising:
   a rotor driven by an electric motor;
   a generator electrically connected to the electric motor and located in a compartment;
   an inlet formed through a side of the compartment to direct sideward airflow into the compartment and across an exterior of the generator;
   the compartment comprising an outlet with the generator positioned in a path between the inlet and the outlet;
   an inlet barrier movable between an open position uncovering the inlet and a closed position blocking the inlet; and
   an outlet barrier movable between an open position uncovering the outlet and a closed position blocking the outlet, wherein each of the inlet barrier and the outlet barrier are operable to be moved to the open position when a condition meets or exceeds a trigger limit and to be moved to the closed position when the condition is less than the trigger limit.

4. The VTOL aircraft of claim 3, wherein the generator comprises a heat exchanger, the heat exchanger oriented generally perpendicular to the inlet.

5. The VTOL aircraft of claim 3, wherein the outlet is located on an opposite side of the compartment from the inlet.

6. A method, comprising:
   directing a sideward airflow into a compartment of an in-flight vertical takeoff and landing (VTOL) aircraft to cool a heat-generating component inside of the compartment, wherein the sideward airflow is directed through an inlet in a side of the compartment, across an exterior surface of the heat-generating component, and through an outlet;
   the directing comprising moving an inlet barrier from a closed position blocking the inlet to an open position uncovering the inlet and moving an outlet barrier from a closed position blocking the outlet to an open position uncovering the outlet in response to a condition meeting or exceeding trigger limit; and
   moving the inlet barrier and the outlet barrier to the closed position when the condition is less than the trigger limit.

7. The method of claim 6, wherein the heat-generating component is a generator.

8. The apparatus of claim 1, further comprising:
   an actuator coupled to the inlet barrier;
   a sensor to measure the condition; and
   a controller in communication with the sensor and the actuator, the controller operable to move the inlet barrier between the open and the closed position.

9. The apparatus of claim of claim 1, wherein the outlet is located on an opposite side of the compartment from the inlet.

10. The VTOL aircraft of claim 3, wherein the inlet is formed through the side of the compartment relative to forward flight and directed into the sideward airflow; and
    the outlet is located on an opposite side of the compartment from the inlet.

11. The VTOL aircraft of claim 3, wherein the rotor is a tail rotor.

12. The VTOL aircraft of claim 3, further comprising an actuator coupled to the inlet barrier;
    a sensor to measure the condition; and
    a controller in communication with the sensor and the actuator, the controller operable to move the inlet barrier between the open and the closed position.

13. The VTOL aircraft of claim 12, wherein the rotor is a tail rotor.

14. The method of claim 6, wherein the condition is a velocity of the sideward airflow.

15. The method of claim 6, wherein the condition is a temperature of the compartment or of the heat-generating component.

16. The method of claim 6, wherein the heat-generating component is a generator.

17. The method of claim 16, wherein the generator is electrically connected to an electric motor driving a rotor.

18. The method of claim 17, wherein the condition is a velocity of the sideward airflow.

19. The method of claim 17, wherein the condition is a temperature of the compartment or of the heat-generating component.

20. The method of claim 17, wherein the heat-generating component comprises a heat-exchanger.

* * * * *